(12) United States Patent
Morovic et al.

(10) Patent No.: US 10,225,438 B2
(45) Date of Patent: Mar. 5, 2019

(54) HALFTONING OF OBJECT DATA FOR A THREE-DIMENSIONAL OBJECT

(71) Applicant: Hewlett-Packard Development Company, L.P., Houston, TX (US)

(72) Inventors: Peter Morovic, Barcelona (ES); Jan Morovic, Colchester (GB); Jay S. Gondek, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/746,751

(22) PCT Filed: Oct. 30, 2015

(86) PCT No.: PCT/US2015/058435
§ 371 (c)(1),
(2) Date: Jan. 22, 2018

(87) PCT Pub. No.: WO2017/074447
PCT Pub. Date: May 4, 2017

(65) Prior Publication Data
US 2018/0239567 A1    Aug. 23, 2018

(51) Int. Cl.
*H04N 1/00* (2006.01)
*B33Y 50/00* (2015.01)
(Continued)

(52) U.S. Cl.
CPC ........... *H04N 1/405* (2013.01); *B29C 64/386* (2017.08); *B29C 64/393* (2017.08); *B33Y 50/02* (2014.12);
(Continued)

(58) Field of Classification Search
CPC ........ H04N 1/405–1/4058; H04N 1/52; G06K 15/1872–15/1881; B33Y 50/00;
(Continued)

(56) References Cited

U.S. PATENT DOCUMENTS 5,818,971 A * 10/1998 Moolenaar ............. H04N 1/405
382/252
5,949,964 A *  9/1999 Clouthier ............... G06K 15/02
358/2.1
(Continued)

FOREIGN PATENT DOCUMENTS

WO    WO-2004037520    5/2004

OTHER PUBLICATIONS

Brunton, A. et al., "Pushing the Limits of 3D Color Printing: Error Diffusion with Translucent Materials", Jun. 8, 2015, 15 pages. http://arxiv.org/pdf/1506.02400.pdf.
(Continued)

*Primary Examiner* — Scott A Rogers
(74) *Attorney, Agent, or Firm* — HP Inc. Patent Department (57) ABSTRACT

Certain examples described herein relate to the processing of object data corresponding to a three-dimensional object. First data corresponding to a first portion of the three-dimensional object and second data corresponding to a second portion of the three-dimensional object, separate from the first portion, are determined. The first data is halftoned using a first halftoning technique to generate control instructions for an apparatus to produce the first portion of the three-dimensional object. The second data is halftoned using a second halftoning technique to generate control instructions for the apparatus to produce the second portion of the three-dimensional object.

15 Claims, 4 Drawing Sheets

(51) Int. Cl.
   *B33Y 50/02* (2015.01)
   *G06K 15/02* (2006.01)
   *H04N 1/405* (2006.01)
   *B29C 64/386* (2017.01)
   *B29C 64/393* (2017.01)
(52) U.S. Cl.
   CPC ......... *G06K 15/18* (2013.01); *G06K 15/1881* (2013.01); *H04N 1/00644* (2013.01); *B33Y 50/00* (2014.12)
(58) Field of Classification Search
   CPC ..... B33Y 50/02; B29C 64/386; B29C 64/393; G06T 19/20
   See application file for complete search history.

(56) References Cited

U.S. PATENT DOCUMENTS

| | | | |
|---|---|---|---|
| 5,970,178 A * | 10/1999 | Lin | H04N 1/4053 382/251 |
| 6,165,406 A | 12/2000 | Jang et al. | |
| 6,356,362 B1 * | 3/2002 | Ostromoukhov | H04N 1/4053 358/1.9 |
| 6,375,874 B1 | 4/2002 | Russell et al. | |
| 6,643,031 B1 * | 11/2003 | Takano | H04N 1/40037 358/1.9 |
| 6,780,368 B2 | 8/2004 | Liu et al. | |
| 7,701,612 B2 * | 4/2010 | Ike | H04N 1/405 358/2.1 |
| 9,286,554 B1 * | 3/2016 | Maltz | G06K 15/1881 |
| 9,787,871 B2 * | 10/2017 | Schweid | G06F 17/50 |
| 2002/0186414 A1 | 12/2002 | Crossland et al. | |
| 2004/0183796 A1 | 9/2004 | Velde et al. | |
| 2007/0139716 A1 | 6/2007 | Chen | |
| 2013/0095302 A1 * | 4/2013 | Pettis | B32B 3/10 428/195.1 |
| 2013/0287933 A1 * | 10/2013 | Kaiser | B29C 67/0055 427/9 |
| 2014/0277661 A1 | 9/2014 | Amadio et al. | |
| 2017/0246811 A1 * | 8/2017 | Donovan | B29C 67/0088 |
| 2017/0246812 A1 * | 8/2017 | Morovic | B29C 67/0088 |
| 2017/0252979 A1 * | 9/2017 | Donovan | H04N 1/405 |
| 2017/0318186 A1 * | 11/2017 | Morovic | H04N 1/405 |
| 2017/0365095 A1 * | 12/2017 | Morovic | G06T 17/10 |
| 2018/0052447 A1 * | 2/2018 | Morovic | G05B 19/4099 |
| 2018/0086045 A1 * | 3/2018 | Morovic | B33Y 50/02 |

OTHER PUBLICATIONS

International Search Report and Written Opinion dated Jan. 25, 2016, PCT Patent Application No. PCT/US2015/058435, filed Oct. 30, 2015, Korean Intellectual Property Office.

* cited by examiner

Fig. 5

HALFTONING OF OBJECT DATA FOR A THREE-DIMENSIONAL OBJECT

CLAIM FOR PRIORITY

The present application is a national stage filing under 35 U.S.C. § 371 of PCT application number PCT/US2015/058435, having an international filing date of Oct. 30, 2015, the disclosure of which is hereby incorporated by reference in its entirety.

BACKGROUND

Apparatus that generate three-dimensional objects, including those commonly referred to as "3D printers", have been proposed as a potentially convenient way to produce three-dimensional objects. These apparatus typically receive a definition of the three-dimensional object in the form of an object model. This object model is processed to instruct the apparatus to produce the object using one or more production materials. These production materials may comprise a combination of agents and powdered substrates, heated polymers and/or liquid solutions of production material. The processing of an object model may be performed on a layer-by-layer basis. It may be desired to produce a three-dimensional object with one or more properties, such as color, mechanical and/or structural properties. The processing of the object model may vary based on the type of apparatus and/or the production technology being implemented. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

This disclosure describes various techniques for producing a 3D object corresponding to object data using so-called "3D printing". To produce a printed 3D object, object data for the desired 3D object is processed to form control instructions for a 3D printing apparatus. These control instructions can be compatible with the available printing operations that can be performed by the 3D printing apparatus. For example, a 3D printing apparatus has a finite number k of available printing materials and a finite number L of levels of discrete material formation (e.g. L equals three if at each print location the amount of each printing material that can be deposited corresponds to zero, one or two units). In such a 3D printing apparatus, the content data can be processed using halftoning to generate control instructions in which there are $L^k$ possible discharge operations for each print location.

The object data is electronic data representative of a 3D object with which a human being can interact. As such, the object data stores data representing at least one physical parameter for each of a plurality of locations in the 3D object. The object data can correspond to a three-dimensional array of locations with the at least one physical parameter stored for each location corresponding to an optical property and/or a mechanical property of that location such that the object data represents a three-dimensional object having a defined appearance and/or mechanical function.

For certain 3D objects, there are different constraints involved for locations in different portions of the 3D object. For such examples, there is a challenge to convert the object data into control instructions for the 3D object in a manner that achieves satisfies these constraints in a computationally efficient manner.

Certain examples described herein process received object data for a three-dimensional object to determine first data corresponding to a first portion of the three-dimensional object and second data corresponding to a second portion of the three-dimensional object that is separate from (i.e. does not overlap) the first portion. In dependence on the properties of the object, for example optical (i.e. the appearance of the object) or mechanical, different halftoning techniques may be used for the first data and the second data.

For example, the first data may be shell data corresponding to a shell portion of the 3D object and the second data may6 be core data corresponding to a core portion of the 3D object. The shell data is electronic data representative of optical properties and/or mechanical properties of the 3D object at locations in the vicinity of the surface of the 3D object, these locations collectively being referred to as the shell portion of the 3D object. The core data is electronic data for locations within the 3D object away from the surface of the 3D object, collectively referred to as the core portion, in such a manner that the core portion of the 3D object is separate from the shell portion of the 3D object. The amount that the shell portion extends away from the surface of the 3D object may be predetermined, and may vary from object to object. In certain examples, the shell portion corresponds to locations within the 3D object which impact the appearance of the surface of the 3D object. The shell data may be processed using error diffusion halftoning to produce control instructions for the shell portion of the 3D object in order to mitigate the impact of any difference between the object data and the printed output as a result of the available printing operations of the 3D printer being incapable of exact reproduction of the source content data, and the core data may be processed using matrix halftoning to produce control instructions for the core portion of the 3D object. The matrix halftoning is computationally cheap and fast in comparison with the error diffusion halftoning, while the error diffusion halftoning provides a more accurate representation of the source object data. In this way, a 3D object is produced having higher levels of both spatial and visual detail at the surface of the 3D object in comparison with applying matrix halftoning to the entirety of the object data, while also being computationally cheaper and faster in comparison with applying error diffusion halftoning to the entirety of the object data.

In another example, a core portion of the object may involve an intricate arrangement designed to provide high strength at low weight, whereas a shell portion may be desired to be simply a solid shell. In such an example, a more computationally expensive halftoning technique may be used for the core data than for the shell data in order to maintain the mechanical properties of the core portion in the produced three-dimensional object.

Figure 1:
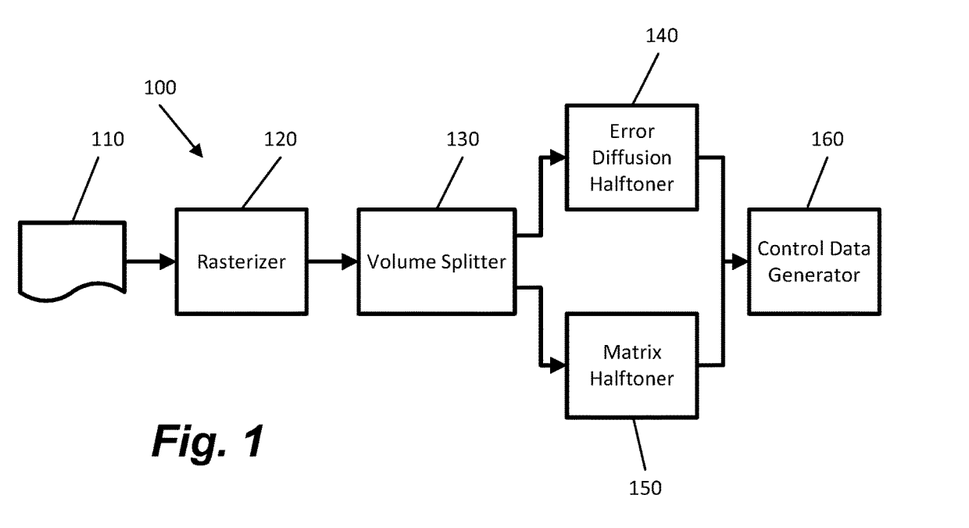
FIG. 1 is a schematic diagram showing an apparatus for processing object data representing a three-dimensional object to generate control instructions for an apparatus to produce the three-dimensional object according to an example.

FIG. 1 shows schematically an example 100 of a processing pipeline for converting object data 110 into control instructions for a 3D printer. In the example 100, the object data 110 comprises three-dimensional object model data received in a vector-based format, e.g. data from a STereo-Lithography ".stl" file. Vector-based formats represent a three-dimensional object using defined model geometry, such as meshes of polygons and/or combinations of three-dimensional shape models. For example, a ".stl" file may comprise a vector representation in the form of a list of vertices in three dimensions, together with a surface tessellation in the form of a triangulation or association between three vertices.

The object data 110 is received by a rasterizer 120, which in certain examples processes the object data 110 into a raster-based format in which the 3D object is represented by a three-dimensional array of unit volumes referred to herein as voxels, in a similar manner to the way in which a two-dimensional image is divided into unit areas referred to as "pixels", with a material volume coverage (M-Vo-C or MVoc) representation being provided for each voxel. In one case, cubic volumes may be used with a common value for each of the height, width and depth of a voxel. In other cases, custom unit volumes or voxels may be defined, e.g. where the unit volume is non-cubic and/or has values of height, width and depth that differ from each other with (although each voxel has the same height, width and depth as other voxels in the raster representation). In certain cases, the unit volume or voxel may be a non-standard or custom-defined three-dimensional shape.

In one case the unit volumes or "voxels" are aligned against a grid resolution. For example, consider a simple case where the received object data comprises a model of a three-dimensional object bounded by a cubic volume. In this case each of the x, y and z axes of the bounding volume may be divided into units, e.g. a bounding 20 cm*20 cm*20 cm volume of the vector representation may have a raster resolution of 2 cm/voxel, wherein each axis is split into divisions of 10 and the bounding volume is split into 1000 voxels (10*10*10). Each unit volume of voxel is then assigned a material volume coverage vector based on color and/or material properties defined for the three-dimensional object, e.g. in the object data.

As described above, in certain implementations voxels may have custom or non-standard volumes, e.g. of a form that is not a regular cubic sub-division. For example, in one case, an x-y resolution may differ from a z-resolution, e.g. the bounding volume above may be split into 2500 voxels with a resolution of 10*10*25. In other cases voxels may be based on Delaunay tessellations (e.g. tetrahedra that fill the object) or any other space-filling polyhedra. In the context of 3D printing, the voxels may correspond to print-resolution addressable locations.

The material volume coverage representation for a voxel comprises a material volume coverage vector representing a probabilistic distribution of materials available to an apparatus for production of the three-dimensional object and combinations of said materials. The probabilistic distribution relates to all combinations of materials, e.g. build, finishing, agents and powders, including separate use of materials, joint use of materials, and an absence of any materials.

To explain the components of a material volume coverage vector, a simple example may be considered. In this simple example, an apparatus is arranged to use two materials to generate a three-dimensional object: M1 and M2. These may be fluid build materials that are deposited on a substrate or platen, or they may comprise two deposit-able colored agents that are deposited on one or more layers of powdered build material. In one case, these materials may comprise combinations of at least one of agents, inks and powdered build materials. In one case the materials may relate to one of agents, inks and powdered build materials and/or may relate to a subset of these materials. If the apparatus is arranged to deposit discrete amounts of each material, e.g. in binary deposits, there are four different material combination states: a first state for the deposit of M1 without M2; a second state for the deposit of M2 without M1; a third state for the deposit of both M1 and M2, e.g. M2 deposited over M1 or vice versa; and a fourth state for an absence of both M1 and M2, e.g. "blank" (Z) or an inhibitor. In this case, the material volume coverage vector has four vector components: [M1, M2, M1M2, Z]. Each voxel of a raster representation thus has a material volume coverage vector of this form. In the case of the last vector component, "blank" or "Z" may represent "empty" or an absence of materials in a processed layer, e.g. if agents are deposited on layers of build material this may denote an absence of build material for the processed layer, even though the build material may not be removed until the complete object has been produced.

This may be contrasted with a comparative method that associates material proportions to each voxel. In these comparative methods, a percentage of each of materials M1 and M2 are defined for each voxel, e.g. [M1, M2] wherein the vector is normalized to 1 (for ranges of 0-1) or 100% (for percentage ranges). In this comparative case, there is no consideration of the combination of M1 and M2, nor is there a consideration of the absence of both materials. As such these comparative methods do not consider material combinations; without considering the material combinations the defined material proportions cannot be linearly combined and exhibit non-linearities that make processing problematic. Additionally, the definition and use of material combinations provide more accurate and exact control of the materials that are used. For example, particular values for a given percentage of each of materials M1 and M2 as defined for a voxel, e.g. [M1=0.5, M2=0.5], may be controlled using a plurality for material volume coverage vector values, e.g. various combinations of M1, M2 and M1M2. Defining the absence of any material ("Z") as a particular material combination also further facilitates this control.

More generally, for an apparatus having k available materials and L discrete deposit states for said materials, a material volume coverage vector comprises $L^k$ vector components, each vector component representing an available material/deposit state combination, including separate and joined use and an absence of any material. Or in other words, the vector components of a material volume coverage vector represent all materials available to an apparatus and their combinations, they are an enumeration of possible build or deposit states available to the apparatus. These states are the "material primaries" discussed herein. As such the material volume coverage vector has a dimensionality representative of these states and contains the volume coverages (e.g. probabilities) associated with each state. Or in other words, a material volume coverage vector (MVoc) comprises weighted combinations or probabilities of material primaries. This compares to the comparative methods discussed above that have k vector components. As can be seen, the present examples and the comparative methods rapidly diverge when a plurality of materials are available with a plurality of production build states; material volume coverage space is much greater than comparative material representation spaces. The vector components of a material volume coverage vector represent all materials available to an apparatus and their combinations. These materials may comprise, amongst others, any combination of: different build materials, different binders, different material property modifiers, different build powders, different agents, different epoxies and different inks. This provides another distinction when compared to comparative methods: any materials available to the apparatus may be included in the material volume coverage vector, e.g. this need not be limited to available colored build materials. In one case, depending on the implementation, the "available materials" may be a selected subset of materials, e.g. may comprise activated or deposit-able materials for a particular production run.

In the example of FIG. 1, the data output by the rasterizer 120 is input to a volume splitter 130, which processes the data output by the rasterizer to determine shell data corresponding to a shell portion of the three-dimensional object and core data corresponding to a core portion of the three-dimensional object in a manner that will be described in more detail hereafter. The volume splitter 130 outputs the shell data to an error diffusion halftoner 140 that applies error diffusion halftoning to the shell data to generate control instructions for a 3D printer to produce the shell portion of the 3D object. The volume splitter 130 outputs the core data to a matrix halftoner that applies matrix halftoning to the core data to generate control instructions for the 3D printer to produce the core portion of the 3D object. The control instructions output by the error diffusion halftoner 140 and the control instructions output by the matrix halftoner 150 are then input to a control data generator 160 to generate control instructions for a 3D printer to reproduce the 3D object.

In certain examples, the processing operations performed by the processing pipeline 100 are distributed over at least two devices. For example, the at least part of the processing performed by the rasterizer 120 may be implemented in a device remote to the device that implements the volume splitter 130, error diffusion halftoner 140, matrix halftoner 150 and control data generator 160.

Figure 2:
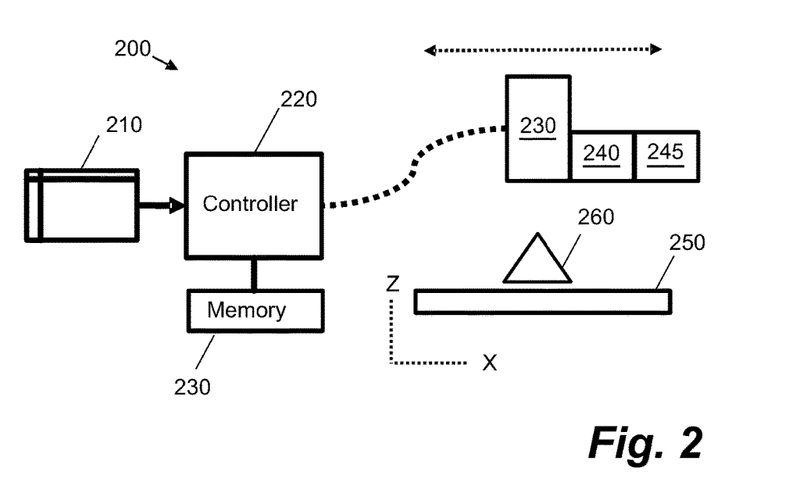
FIG. 2 is a schematic diagram showing an apparatus for production of a three-dimensional object according to an example.

FIG. 2 shows an example of an apparatus 200 arranged to produce a three-dimensional object 260. The apparatus 200 is arranged to receive data 210 for the three-dimensional object. The apparatus 200 comprises a production controller 220 and a memory 230. The production controller 220 may comprise one or more processors that form part an embedded computing device, e.g. adapted for use in controlling an additive manufacturing system. Memory 230 may comprise volatile and/or non-volatile memory, e.g. a non-transitory storage medium, arranged to store computer program code, e.g. in the form of firmware. The production controller 220 is communicatively coupled to aspects of the apparatus that are arranged to construct the three dimensional object. These comprise a build mechanism 230 and a supply mechanism 240, 245. In the schematic example of FIG. 2, the supply mechanism 240, 245 comprise two components: a first component 240 for the supply of a first material (e.g. build material M1 as discussed above) and a second component 245 for the supply of a second material (e.g. build material M2 as discussed above). Two materials are presented in this example for ease of explanation but any number of materials may be supplied. The build mechanism 230 is arranged to deposit a combination of one or more material components from the set of material components to produce the three-dimensional object 260. In the example of FIG. 2, the three-dimensional object 260 is built layer by layer on a platen 250. The arrangement of the aspects and components shown in FIG. 2 are not limiting; the exact arrangement of each apparatus will vary according to the production technology that is implemented and the model of apparatus.

In the example of FIG. 2 the production controller 220 is configured to process and/or otherwise use the data 210 to control one or more of the build mechanism 230 and the supply mechanism 240, 245. In one implementation the apparatus 200 may be arranged to use a coalescing agent and a coalescing modifier agent that are respectively supplied by the components of the supply mechanism 240, 245. These agents allow a three-dimensional object to have varying material properties. They form part of the "materials" of the material volume coverage vector. They may be combined with one or more colored build materials, e.g. applied using an inkjet mechanism to deposited powder layers, to generate multi-color objects with varying material properties. The build materials also form part of the "materials" of the material volume coverage vector. The generated objects may be constructed by depositing at least the coalescing agent and the coalescing modifier agent on layers of build material, e.g. layers of powder or other material forming z-plane slices, followed by the application of energy to bind the material, e.g. infra-red or ultra-violet light. For example, one or more of the build mechanism 230 and the supply mechanism 240, 245 may be moveable relative to the platen 250, e.g. in one or more of the x, y and z directions (wherein the y axis is into the sheet for FIG. 2). One or more of the build mechanism 230, the supply mechanism 240, 245 and the platen 250 may be moveable under control of the production controller 220 to achieve this. Additionally, one or more inks may also be deposited on cured and/or uncured layers, wherein these inks also form part of the "materials" of the material volume coverage vector. In other implementations the apparatus may comprise part of, amongst others, selective laser sintering systems, stereo lithography systems, inkjet systems, fused deposition modelling systems, any three-dimensional printing system, inkjet deposition systems and laminated object manufacturing systems. These include apparatus that directly deposits build materials may be used, rather than those described that use various agents.

In one case, the production controller 220 is configured to receive control data output by the processing pipeline shown in FIG. 1. For example, the pipeline 100 shown in FIG. 1 may be located on a computer device that is communicatively couplable to the apparatus 200. The pipeline 100 shown in FIG. 1 may further be located on separate computing devices separately by one or more of space and time, e.g. rasterizer 120 may be implemented by a remote server device (e.g. a hosted or "cloud" computing service) and control data generator 160 may be implemented by a local personal computer or mobile device in communication with the apparatus 200 (or any associated combination).

In another case, the pipeline 100 shown in FIG. 1 may be implemented by production controller 220; e.g. data 210 may comprise either object data 110 or material volume coverage representation. This may be the case for a "stand alone" apparatus that is arranged to receive, e.g. by physical transfer and/or over a network, object data 110 and produce an object accordingly. In one case a data interface, e.g. any combination of hardware and control program code, may be arranged to act as a receiver to receive the material volume coverage representation of the three-dimensional object.

Figure 3:
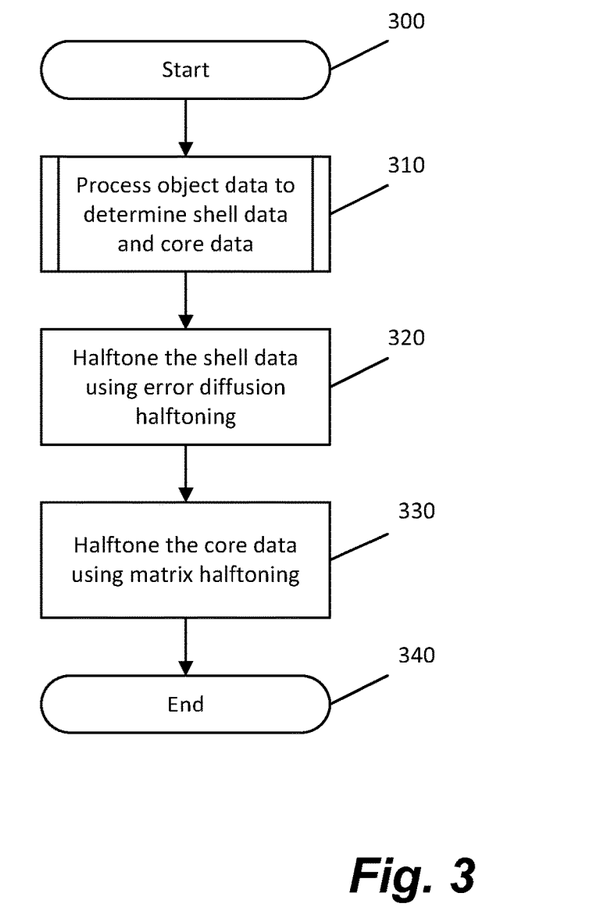
FIG. 3 is a flow diagram showing a method for generating control instructions for an apparatus to produce a three-dimensional object.

As shown in FIG. 3, the pipeline 100 starts, at 300, processing received object data by processing, at 310, the object data to determine shell data and core data. The received object data includes surface color information, which in certain examples is provided via a texture map or color associated with a surface mesh. The shell data may correspond to a shell portion corresponding to locations within the 3D object that are within a previously defined distance of the surface of the 3D object. This predefined distance may correspond to the distance at which full opacity is achieved; in other words locations outside of the shell portion do not substantially affect the appearance of the surface of the 3D object. As such, the predefined distance will be different for different 3D printers in dependence on the building materials used. The more translucent the building material, the greater the predefined distance. If the building materials are completely opaque, the predefined distance can correspond to one voxel at the print resolution of the 3D printer.

Figure 4:
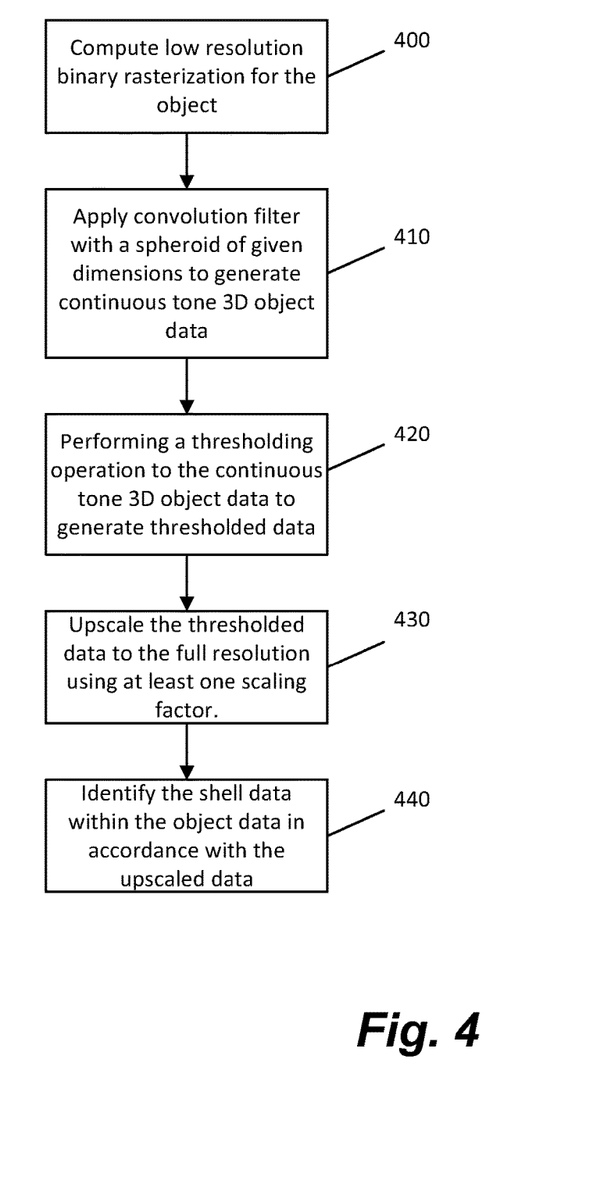
FIG. 4 is a flow chart showing a method for processing object data to generate first data representative of a shell portion of a three-dimensional object and second data representative of a core portion of the three-dimensional object.

In certain examples, as shown in FIG. 4, the pipeline 100 identifies the shell data for rasterized object data by computing, at 400, a low resolution binary rasterization for the 3D object, with the value for each low resolution voxel indicating either presence or absence of the 3D object in that voxel. For ease of processing, the resolution of this binary rasterization may be a multiple of the print resolution of the 3D printer. The pipeline then applies, at 410, a convolution filter with a convolution kernel corresponding to a hollow spheroid of given radius with values of zero in the hollow portion and one in the surface portion of the spheroid. In Cartesian coordinates, if the radii in the x, y and z directions are the same then the spheroid is a sphere. The radii in the x, y and z directions may conform to the print resolutions of the 3D printer in the x, y and z directions (e.g., if the print resolution is 1200 dpi (approximately 475 dots per cm) in the x and y directions and 300 dpi (approximately 120 dots per cm) in the z direction then the spheroid may be squashed in the z-direction by a factor of 4).

The result of applying the convolution filter is continuous tone 3D object data where the value is zero for all locations where the convolution kernel (i.e. the spheroid) is fully outside of the object, is a value 'max_kernel' (equal to the sum of all the non-zero values of the convolution kernel) for all locations where the convolution kernel is completely within the 3D object, and is a value between zero and max_kernel for all other locations. The pipeline 100 then performs, at 420, a thresholding operation on the continuous tone 3D object data to generate thresholded data. In this thresholding operation, for example values that are less than half of max-kernel are set to zero and the remaining values are set to one. The resultant thresholded data is then upscaled, at 430, to the print resolution of the 3D printer. This upscaled data has non-zero values at locations corresponding to the shell portion, and the shell data accordingly comprises the data for corresponding locations within the rasterized object data. Accordingly, the pipeline 100 is able to identify, at 440, the shell data in accordance with the upscaled data. Alternatively, the continuous tone 3D object data may be compared in an AND operation with a binarised version of the original object data (i.e. form a raster with locations corresponding to locations in the original object data having a non-zero value set to a value of 1 and all other locations set to 0) to identify the shell portion.

Other techniques can be used to identify the shell data. For example, if the object is convex then a simple scaling towards the object centroid can be used in which a scaling is applied to each vertex in 3D using a scaling factor that is the reciprocal of the shell thickness relative to the distance of the original vertex to the centroid. Alternatively, a brute force approach can also be taken to computing the shell by analyzing, for each voxel, the voxels within a predefined distance of that voxel, and classifying the voxel in the surface portion if there is an "outside" empty voxel (i.e. a voxel that has a zero value) within the predefined distance and in the core portion if there is no "outside" empty voxel within the predefined distance. In another alternative, if there is a texture-mapped tessellated mesh defining the surface, then that mesh can be used to identify locations within a predetermined distance of the mesh as being in the surface portion.

The shell thickness may be variable in dependence on the Mvoc vector at a surface voxel in order to provide constant opacity with a minimum thickness of shell portion. Alternatively, the shell thickness may be determined locally based on the dimensions of local features such that the shell portion for smaller features is smaller than for larger features.

Returning to FIG. 3, after deriving the surface data and the core data, the pipeline halftones, at 320, the surface data using error diffusion halftoning and halftones, at 330, the core data using matrix halftoning. It will be appreciated that the order in which these halftoning operations is performed is immaterial.

Error diffusion halftoning involves determining the halftone value for a voxel taking into account the errors arising from halftone operations performed on neighboring voxels. As such, error diffusion halftoning incurs a significant processing load. Many different error diffusion halftoning techniques are known and can be applied. In an example, a 3D multi-scale error diffusion (3MED) halftoning technique is used which utilizes a multi-scale error representation to track error for individual voxels and larger regions comprising groups of voxels. This error tracking can be achieved by means of an "Error Oct-Tree" which stores voxel-level error at the highest resolution and the sum of errors stored at increasingly lower resolutions in super-voxels. Error may be diffused in a connected, path-forming manner with the paths being locally constrained or globally constrained. The error in its simplest form is the difference between the desired Mvoc (a weighted/probabilistic combination of Mvecs) at a voxel, and the Mvec that was selected from the Mvoc—the error being the complement of the probability of having placed the Mvec (i.e. if its probability was 0.3 and it was placed, resulting in effect in a probability of 1, the error is −0.7 for that Mvec).

In contrast, matrix halftoning involves comparing the MVoc vector for each voxel with a corresponding value in a threshold matrix to determine the printing operation to be performed. As such, matrix halftoning involves significantly less processing than error diffusion halftoning. A threshold matrix may comprise a dispersed-dot type pattern, such as whitenoise or blue-noise, or clustered-dot types, such as green-noise, AM-screen-like patterns, or others. In certain cases, error diffusion may be used instead of or as well as a threshold matrix. In one case, matrix halftoning may comprise a thresholding operation whereby a value from a threshold matrix is compared against the probability distribution defined by a material volume coverage vector. For example, if a material volume coverage vector has three components each with values of 33%, a cumulative distribution may be generated with three intervals [0-33%, 33%-66%, 66%-100%]. In this case, if a threshold value from the threshold matrix has a value that falls within the first range [0-33%], then an instruction for deposit of the first material or material combination is output. Similarly, if a threshold value from the threshold matrix has a value that falls within the second range [33-66%], then an instruction for deposit of the second material or material combination is output and if a threshold value from the threshold matrix has a value that falls within the third range [66-100%], then an instruction for deposit of the third material or material combination is output. In this case the threshold matrix is configured to provide a uniform (although not regular) distribution of threshold values and as such over a particular area or volume 33% of the area or volume will have each of the three components.

Both error diffusion halftoning and matrix halftoning may be applied layer-by-layer, e.g. on a per slice basis, or for the full three-dimensions of the material volume coverage representation. For matrix halftoning, the former case may comprise applying a threshold matrix per slice, e.g. in two-dimensions, and the latter case may comprise applying a three-dimensional threshold matrix, e.g. an operation in three-dimensions.

The result of the halftoning operations is control data comprising a set of instructions for the apparatus for production of the three-dimensional object. For example, if there are two available materials, M1 and M2, that may be deposited in a binary manner in a series of addressable locations in three-dimensions, the instructions may comprise voxels at the resolution of production and one of the array: [0, 0]—blank; [1, 0]—deposit M1, [0, 1]—deposit M2; and [1, 1]—deposit M1 and M2. The pipeline 100 ends, at 340, the processing by combining the results of the error diffusion halftoning and the matrix halftoning to produce control instructions for an apparatus to produce the 3D object. The interior of a three-dimensional object encoded in a vector-based format is typically interpreted to be solid. In certain examples, a designer may want to specify that the interior of part or all of a three-dimensional object have a lattice structure satisfying one or more conditions. For example, the designer may wish to specify a lattice size or shape to be applied to part or all of a model to control mechanical properties of the three-dimensional object. Such mechanical properties may include one or more of the tensile strength, weight, centre of gravity and metacentre. For example, centre of gravity and metacentre can be controlled by specifying different lattice densities for different parts of the three-dimensional object. This can be achieved using structural halftoning in which a lattice structure for at least part of the core portion is determined in accordance with a structural threshold matrix. For example, one of plural lattice indices may be specified in the object data for all or part of the interior of a three-dimensional object, with each lattice index having an associated threshold matrix such that each lattice index in conjunction with the associated three-dimensional threshold matrix is representative of a lattice structure for a corresponding volume of the three-dimensional object. In this way, the core data can be processed using threshold matrices determined in accordance with lattice indices to generate control instructions for producing the core portion of the three-dimensional object. In such an arrangement, a solid portion may be positioned between the shell portion and the core portion having lattice structure in order to improve the adherence between the shell portion and the core portion. The term "lattice" as described herein refers to an arrangement of a production material within three-dimensions, e.g. this may be a regularly repeated arrangement of a particular sub-structure that makes up a three-dimensional object to be produced. This may cover arrangements that utilize tiling, repeated polyhedra and/or sub-structure repetitions that vary in at least one of density and frequency. In this manner, examples may include, amongst others: a regular crisscrossing of strips of material; (sub)-structure walls with varying thickness; and coil-type structures (including those of varying thickness and hence elasticity). Structures or sub-structures may be repeated in any direction in at least one of the three-dimensions. Frequency of repetition may vary in any direction in at least one of the three-dimensions.

As described above, a first halftoning technique is applied to first data corresponding to a first portion of the 3D object and a second halftoning technique is applied to second data corresponding to a second portion of the 3D object. Depending on the object properties, the first and second halftoning techniques can be selected from all available halftoning techniques, for example two different error diffusion halftoning techniques having different processing costs.

Figure 5:
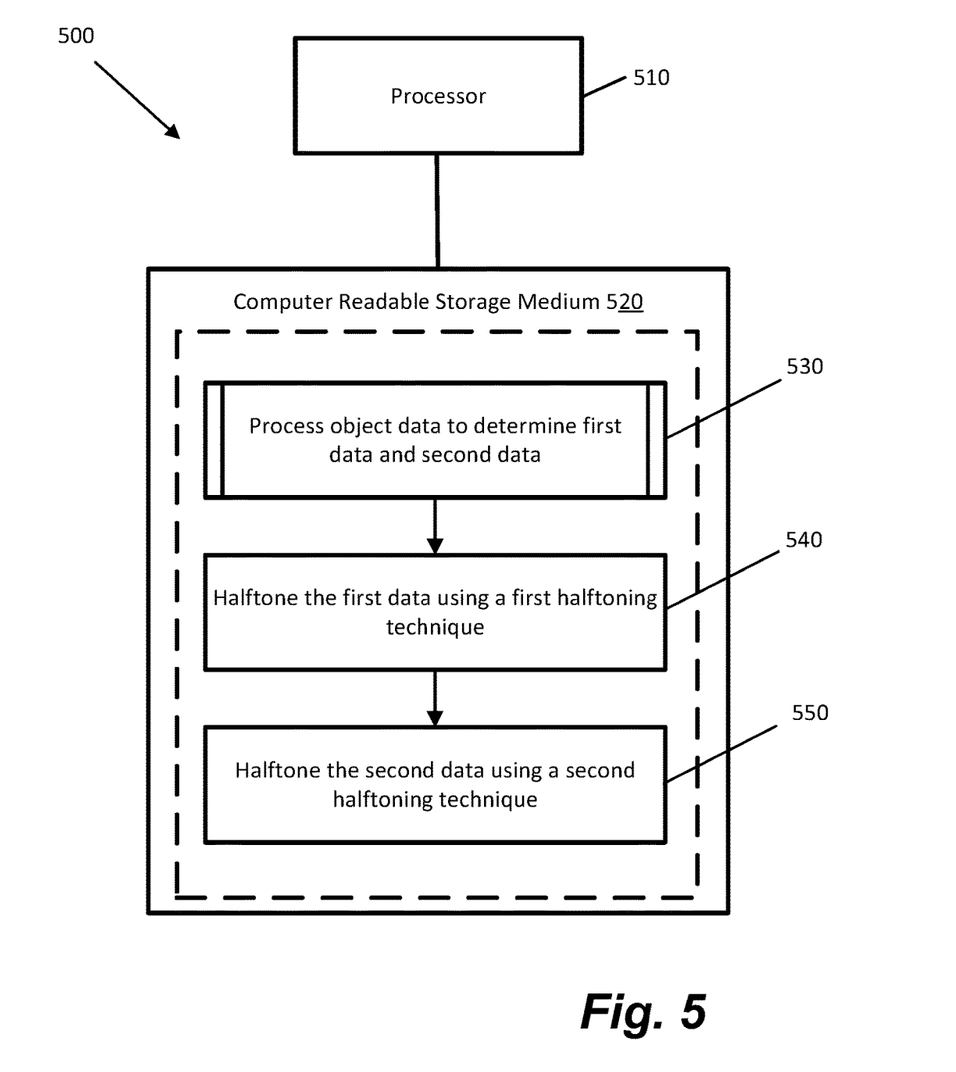
FIG. 5 is a schematic diagram showing a computing device according to an example.

Certain system components and methods described herein may be implemented by way of computer program code that is storable on a non-transitory storage medium. FIG. 5 shows an example of a print control system 500 comprising at least one processor 510 arranged to retrieve data from a computer readable storage medium 520. The computer-readable storage medium 520 comprises a set of computer-readable instructions stored thereon. The set of computer readable instructions are arranged to cause the at least one processor to perform a series of actions. Instruction 530 is arranged to process object data corresponding to a three-dimensional object to determine first data corresponding to a first portion of the three-dimensional object and second data corresponding to a second portion of the three-dimensional object. Instruction 540 is arranged to process the first data using a first halftoning technique to generate control instructions for the apparatus to produce the first portion of the three-dimensional object. Instruction 550 is arranged to process the second data using a second halftoning technique to generate control instructions for the apparatus to produce the second portion of the three-dimensional object.

The computer program code may be implemented by a control system comprising at least one processor that is arranged to retrieve data from a computer-readable storage medium. The control system may comprise part of an object production system such as an additive manufacturing system. The computer-readable storage medium may comprise a set of computer-readable instructions stored thereon. The at least one processor may be configured to load the instructions into memory for processing. The instructions are arranged to cause the at least one processor to perform a series of actions. The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching. Techniques, functions and approaches described in relation to one example may be used in other described examples, e.g. by applying relevant portions of that disclosure.

What is claimed is:

1. A method of processing object data for an apparatus, the apparatus being arranged to produce a three-dimensional object, the method comprising:
receiving object data for a three-dimensional object;
processing the object data to determine first data corresponding to a first portion of the three-dimensional object and second data corresponding to a second portion of the three-dimensional object separate from the first portion of the three-dimensional object, the first portion corresponding to a shell portion of the three-dimensional object and the second portion corresponding to a core portion of the three-dimensional object;
halftoning the first data using a first halftoning technique to generate control instructions for the apparatus to produce the shell portion; and
halftoning the second data using a second halftoning technique to generate control instructions for the apparatus to produce the core portion, the second halftoning technique being different from the first halftoning technique.

2. The method of claim 1, wherein the first halftoning technique comprises error diffusion halftoning and wherein the second halftoning technique comprises matrix halftoning.

3. The method of claim 1, wherein the shell portion has a predetermined thickness.

4. The method of claim 3, wherein the processing of the object data comprises:
generating a low resolution binary rasterization for the three-dimensional object;
convolving the low resolution binary rasterization with a three-dimensional kernel filter corresponding to a hollow spheroid of predetermined dimensions to generate continuous tone three-dimensional edge data;
performing a thresholding operation on the continuous tone three-dimensional edge data to generate binary edge data; and
upscaling the binary edge data to a resolution associated with the printer using at least one scaling factor, wherein the upscaled edge data is indicative of the surface portion of the three-dimensional object, wherein the predetermined dimensions of the spheroid and the at least one scaling factor are in accordance with the predetermined thickness.

5. The method of claim 2, wherein the error diffusion halftoning comprises utilizing a multi-scale error representation to track error for individual voxels and for larger regions comprising groups of voxels.

6. The method of claim 2, wherein the matrix halftoning comprises structural halftoning in which a lattice structure for at least part of the core portion is determined in accordance with a structural threshold matrix.

7. The method according to claim 1, further comprising processing the object data to generate a material volume coverage representation of the three-dimensional object, wherein the material volume coverage representation comprises at least one material volume coverage vector for at least one respective volume forming part of the three-dimensional object, each material volume coverage vector representing a probabilistic distribution of materials available to the apparatus for production of the three-dimensional object, the probabilistic distribution relating to all combinations of said materials including separate use of materials, joint use of materials and an absence of any materials.

8. An apparatus arranged to generate control data for production of a three-dimensional object comprising:
a data interface to receive object data representative of a three-dimensional object;
an object data processor arranged to process the object data to determine first data corresponding to a first portion of the three-dimensional object and second data corresponding to a second portion of the three-dimensional object separate from the first portion; and
a first halftoner arranged to process the first data using a first halftoning technique to generate control instructions for the apparatus to produce the first portion of the three-dimensional object; and
a second halftoner arranged to process the second data using a second halftoning technique to generate control instructions for the apparatus to produce the second portion of the three-dimensional object.

9. The apparatus of claim 8, wherein the first portion is a shell portion and the second portion is a core portion, and wherein the first halftoner is arranged to process the first data using error diffusion halftoning and the second halftoner is arranged to process the second data using matrix halftoning.

10. The apparatus according to claim 9, wherein the object data comprises surface color data.

11. The apparatus according to claim 9, wherein the object processor is arranged to:
generate a low resolution binary rasterization for the three-dimensional object;
convolve the low resolution binary rasterization with a three-dimensional kernel filter corresponding to a spheroid of predetermined dimensions to generate continuous tone three-dimensional edge data;
perform a thresholding operation on the continuous tone three-dimensional edge data to generate binary edge data; and
upscale the binary edge data to a resolution associated with the printer using at least one scaling factor, wherein the upscaled edge data is indicative of the surface portion of the three-dimensional object, wherein the predetermined dimensions of the spheroid and the at least one scaling factor are in accordance with a predetermined thickness for the shell portion.

12. The apparatus of claim 9, wherein the first halftoner is arranged to perform error diffusion halftoning utilizing a multi-scale error representation to track error for individual voxels and for larger regions comprising groups of voxels.

13. The apparatus of claim 9, wherein the second halftoner is arranged to perform structural halftoning in which a lattice structure for at least part of the core portion is determined in accordance with a structural threshold matrix.

14. The apparatus according to claim 8, wherein the object processor is arranged to process the object data to generate a material volume coverage representation of the three-dimensional object, wherein the material volume coverage representation comprises at least one material volume coverage vector for at least one respective volume forming part of the three-dimensional object, each material volume coverage vector representing a probabilistic distribution of materials available to the apparatus for production of the three-dimensional object, the probabilistic distribution relating to all combinations of said materials including separate use of materials, joint use of materials and an absence of any materials.

15. A non-transitory computer-readable storage medium comprising a set of computer-readable instructions stored thereon, which, when executed by a processor, cause the processor to:
  process object data corresponding to a three-dimensional object to determine first data corresponding to a first portion of the three-dimensional object and second data corresponding to a second portion of the three-dimensional object separate from the first portion, the first portion corresponding to a shell portion of the three-dimensional object and the second portion corresponding to a core portion of the three-dimensional object;
  halftone the first data using an error diffusing halftoning technique to generate control instructions for an apparatus to produce the first portion of the three-dimensional object; and
  halftone the second data using matrix halftoning to generate control instructions for the apparatus to produce the second portion of the three-dimensional object.

* * * * *